United States Patent
Govil et al.

(10) Patent No.: US 11,973,809 B2
(45) Date of Patent: Apr. 30, 2024

(54) OMNI-CHANNEL ADAPTER

(71) Applicant: Twillio Inc., San Francisco, CA (US)

(72) Inventors: Shubha Govil, Union City, CA (US);
Amool Gupta, Berkeley, CA (US);
Aymen Naim, Walnut Creek, CA (US);
Torsten Budesheim, Mill Valley, CA (US); Charlie Helin, Murrieta, CA (US)

(73) Assignee: Twilio Inc., San Francisco, CA (US)

( * ) Notice: Subject to any disclaimer, the term of this patent is extended or adjusted under 35 U.S.C. 154(b) by 0 days.

(21) Appl. No.: 17/660,998

(22) Filed: Apr. 27, 2022

(65) Prior Publication Data
US 2023/0353605 A1  Nov. 2, 2023

(51) Int. Cl.
*H04L 65/1089* (2022.01)
*H04L 65/1069* (2022.01)
*H04L 65/1104* (2022.01)
*H04L 67/141* (2022.01)

(52) U.S. Cl.
CPC ...... *H04L 65/1089* (2013.01); *H04L 65/1069* (2013.01); *H04L 67/141* (2013.01); *H04L 65/1104* (2022.05)

(58) Field of Classification Search
None
See application file for complete search history.

(56) References Cited

U.S. PATENT DOCUMENTS

| | | | |
|---|---|---|---|
| 9,226,217 B2 | 12/2015 | Malatack | |
| 9,907,010 B2 | 2/2018 | Malatack | |
| 10,440,627 B2 | 10/2019 | Malatack | |
| 10,841,411 B1* | 11/2020 | Nandyal | H04L 65/1104 |
| 10,873,892 B2 | 12/2020 | Malatack | |
| 2007/0124379 A1* | 5/2007 | Coraluppi | H04L 12/1813 709/204 |
| 2018/0316634 A1* | 11/2018 | Driscoll | H04L 51/04 |
| 2021/0044555 A1* | 2/2021 | Orr | H04L 65/1069 |
| 2021/0136652 A1 | 5/2021 | Malatack | |
| 2021/0409352 A1* | 12/2021 | Arunachalam | H04L 63/102 |
| 2023/0041924 A1* | 2/2023 | Wittstock | H04L 51/214 |

* cited by examiner

*Primary Examiner* — Schquita D Goodwin
*Assistant Examiner* — Ishrat Rashid
(74) *Attorney, Agent, or Firm* — Schwegman Lundberg & Woessner, P.A.

(57) ABSTRACT

An omni-channel adapter receives a request to create a communication session for a customer. Based on the request, the omni-channel adapter selects a channel-specific orchestrator. The request is modified, or a new request is generated, to suit the selected channel-specific orchestrator. The channel-specific request is sent to the channel-specific orchestrator. In response, the channel-specific orchestrator creates the communication session. Further communications between the customer and the channel-specific orchestrator may also be intermediated by the omni-channel adapter, which may maintain state information about the communication session. For example, a unique identifier may be generated by the omni-channel adapter or the channel-specific orchestrator for the communication session. A request by the customer to add an additional device to the communication session may include the identifier of the session. Based on the identifier of the session, the omni-channel adapter identifies the channel-specific orchestrator for the communication session.

20 Claims, 8 Drawing Sheets

ORCHESTRATOR TABLE — 305

| CHANNEL | URL |
| --- | --- |
| VOICE | HTTP://WWW.TWILIO.COM/VOICE/ |
| EMAIL | HTTP://WWW.TWILIO.COM/EMAIL/ |
| SMS | HTTP://WWW.TWILIO.COM/SMS/ |
| MMS | HTTP://WWW.TWILIO.COM/MMS/ |
| RCS | HTTP://WWW.TWILIO.COM/RCS/ |

SESSION TABLE — 320

| SESSION ID | CHANNEL | STATUS |
| --- | --- | --- |
| 1 | VOICE | ACTIVE |
| 2 | EMAIL | INACTIVE |

SESSION PARTICIPANTS TABLE — 335

| SESSION ID | PARTICIPANT ID |
| --- | --- |
| 1 | 10 |
| 1 | 11 |
| 1 | 12 |

INTERACTION TABLE — 350

| INTERACTION ID | SESSION ID |
| --- | --- |
| 100 | 1 |
| 100 | 2 |

*FIG. 3*

OMNI-CHANNEL ADAPTER

TECHNICAL FIELD

An embodiment of the present subject matter relates generally to communication, and, more specifically, to an omni-channel adapter.

BACKGROUND

Message delivery service providers provide message delivery functionality to customers. A customer uses an interface provided by the message delivery service to send messages. Different message delivery services use different channels and provide different interfaces.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 3 is a block diagram of an example database schema, suitable for storing data used by an omni-channel exchange system.

DETAILED DESCRIPTION

Figure 1:
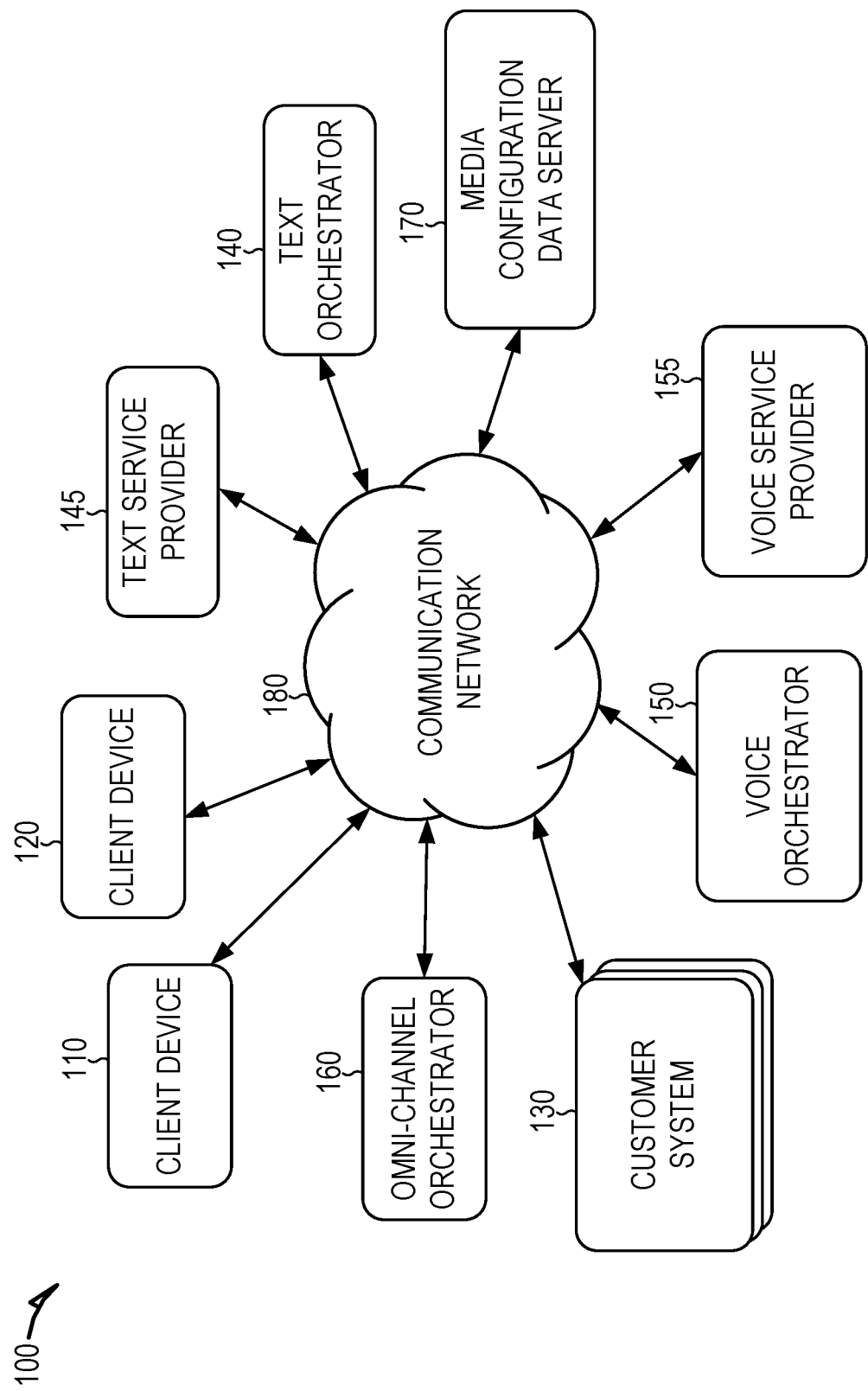
FIG. 1 shows an example network environment in which an omni-channel orchestrator intermediates communication service requests from customers to orchestrators for different channels, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

As used herein, the term channel refers to communication delivery channels. Different communication delivery channels use different technologies to deliver messages. Example channels include the short message service (SMS), email, the multimedia messaging system (MMS), voicemail, and proprietary channels such as WeChat™, WhatsApp™, and iMessage™. By contrast, a route refers to a communication delivery path, defined by a series of computers and routers through which the communication is transferred from a source computer to a destination computer. Thus, the same route may be used to transfer messages using different channels, and the same channel may be used to transfer messages using different routes. In some example embodiments, different channels correspond to different applications on a receiving device. For example, a smart phone may have one app to handle SMS messages, another app to handle email, and a third app to handle voicemail. Alternatively, some applications may handle multiple channels. For example, one app may handle both SMS and MMS messages.

As used herein, the term communication session refers to a single communication or multiple related communications using a communication delivery channel. As used herein, the term interaction refers to zero or more communication sessions, using the same or different communication delivery channels, related to a single topic. For example, a user may contact help desk personnel via a web-based chat interface (a first communication delivery channel) to request help with a technical problem. In response, the help desk personnel may send an email (using a second communication delivery channel) to an email address on file for the user with instructions to resolve the problem. Thereafter, the user may call (using a third communication delivery channel) a technical support phone number to request additional information. Each of these communication sessions is part of a single interaction. In an example, an interaction may be created regarding a topic before any communication session is established (e.g., zero communication sessions).

An omni-channel adapter receives a request to create a communication session for a customer. Based on the request, the omni-channel adapter selects a channel-specific orchestrator. The request is modified, or a new request is generated, to suit the selected channel-specific orchestrator. The channel-specific request is sent to the channel-specific orchestrator. In response, the channel-specific orchestrator creates the communication session.

Further communications between the customer and the channel-specific orchestrator may also be intermediated by the omni-channel adapter, which may maintain state information about the communication session. For example, a unique identifier may be generated by the omni-channel adapter or the channel-specific orchestrator for the communication session. A request by the customer to add an additional device or channel to the communication session may include the identifier of the communication session. Based on the identifier of the communication session and stored data regarding the communication session, the omni-channel adapter identifies the channel-specific orchestrator for the communication session. Thus, the customer is saved the effort of directly interfacing with multiple channel-specific orchestrators.

FIG. 1 shows an example network environment 100 in which an omni-channel orchestrator intermediates communication service requests from customers to orchestrators for different channels, according to some example embodiments. As shown, multiple devices (i.e., a client device 110, a client device 120, a customer system 130, a text orchestrator 140, a text service provider 145, a voice orchestrator 150, a voice service provider 155, an omni-channel orchestrator 160, and a media configuration data server 170) are connected to a communication network 180 and configured to communicate with each other through use of the communication network 180. The communication network 180 is any type of network, including a local area network (LAN), such as an intranet; a wide area network (WAN), such as the Internet; a telephone and mobile device network, such as a cellular network; or any combination thereof. Further, the communication network 180 may be a public network, a private network, or a combination thereof. The communication network 180 is implemented using any number of communication links associated with one or more service providers, including one or more wired communication links, one or more wireless communication links, or any combination thereof. Additionally, the communication network 180 is configured to support the transmission of data formatted using any number of protocols.

Multiple computing devices can be connected to the communication network 180. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 800 shown in FIG. 8.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

In the network environment 100, users may interact with a customer system 130 to utilize online services provided by a customer. Users communicate with and utilize the functionality of the customer system 130 by using the client devices 110 and 120 that are connected to the communication network 180 by direct and/or indirect communication. The customer may provide any type of service, whether it be online or offline, and the customer system 130 may facilitate any related service that is provided online, such as a ride-sharing service, reservation service, retail service, news service, and so forth.

Although the shown network environment 100 includes only two client devices 110, 120 and one customer system 130, this is only for ease of explanation and is not meant to be limiting. One skilled in the art would appreciate that the network environment 100 can include any number of client devices 110, 120 and/or customer systems 130. Further, each customer system 130 may concurrently accept communications from and initiate communication messages to and/or interact with any number of client devices 110, 120, as well as support connections from a variety of different types of client devices 110, 120, such as desktop computers; mobile computers; mobile communications devices, e.g., mobile phones, smart phones, tablets; smart televisions; set-top boxes (STBs); and/or any other network enabled computing devices. Hence, the client devices 110 and 120 may be of varying type, capabilities, operating systems, and so forth.

A user interacts with a customer system 130 via a client-side application installed on the client devices 110 and 120. In some embodiments, the client-side application includes a component specific to the customer system 130. For example, the component may be a stand-alone application, one or more application plug-ins, and/or a browser extension. However, the users may also interact with the customer system 130 via a third-party application, such as a web browser or messaging application, that resides on the client devices 110 and 120 and is configured to communicate with the customer system 130. In either case, the client-side application presents a user interface (UI) for the user to interact with the customer system 130. For example, the user interacts with the customer system 130 via a client-side application integrated with the file system or via a webpage displayed using a web browser application.

A customer system 130 is one or more computing devices associated with a customer to provide functionality of the customer. For example, the customer system 130 may provide an online service. The online service may be any type, such as a banking service, travel service, retail service, and so forth. The customer system 130, however, does not have to provide an online service that is accessible to users. That is, the customer system 130 may simply be a computing system used by a customer to perform any type of functionality.

A customer may use a customer system 130 to cause transmission of messages, such as SMS messages, voice messages, rich communication service (RCS) messages, email messages, and the like. For example, a customer system 130 may provide online functionality that enables users of the customer system 130 to transmit messages to agents of the customer and/or other users. As another example, the customer system 130 may transmit messages to users to provide the users with two-factor authentication, password resets, updates, links to content, promotions, or any suitable combination thereof.

A service provider (e.g., the text service provider 145 or the voice service provider 155) provides message delivery functionality, which can be utilized by a customer. For example, the service provider charges a customer a fee for each message of the customer that is delivered by the service provider. The network environment 100 may include any number of service providers. Different service providers may deliver messages using different channels. For example, the text service provider 145 may deliver messages using SMS or email, the voice service provider 155 may deliver messages using voicemail, and another service provider may deliver messages using a proprietary application. Some service providers may have the capability of delivering messages using multiple channels and may charge the same fee for delivery regardless of channel or may have different fees for different channels. A customer initially creates a relationship with a service provider to deliver messages for the customer. For example, a customer may enter into an agreement with a service provider that provides the best price, quality of service, and/or channel preference based on the needs of the customer. These factors, however, may change over time. For example, the needs of the customer may change and/or the price, channels, and quality of service provided by the service providers may change.

The customer system 130 may use a channel-specific orchestrator (e.g., the text orchestrator 140 or the voice orchestrator 150) as an intermediary to simplify communication with a service provider. For example, the text service provider 145 may provide a simple API that receives a phone number and a message as input, sends the message to the phone number, and provides a status code indicating whether the message was sent successfully. The text orchestrator 140 may provide additional functionality to support batch messaging, automatic retrying of failed messages, scheduling to send messages at predetermined times or intervals, and the like.

The omni-channel orchestrator 160 may provide an additional layer of functionality, acting as an intermediary to simplify communication with multiple channel-specific orchestrators. For example, the omni-channel orchestrator 160 may allow the customer system 130 to send messages using multiple services using a single API.

The customer system 130 may provide configuration data to the media configuration data server 170. The media configuration data server 170 may store the configuration data in a database. The orchestrators (e.g., the text orchestrator 140, the voice orchestrator 150, and the omni-channel orchestrator 160) may request some or all of the configuration data from the media configuration data server 170, which provides the requested data via the communication network 180. Thus, the customer system 130 provides the configuration data once, but the configuration data can be accessed on request by multiple systems, allowing the orchestrators and service providers to customize the services provided according to the customer's preferences.

Figure 2:
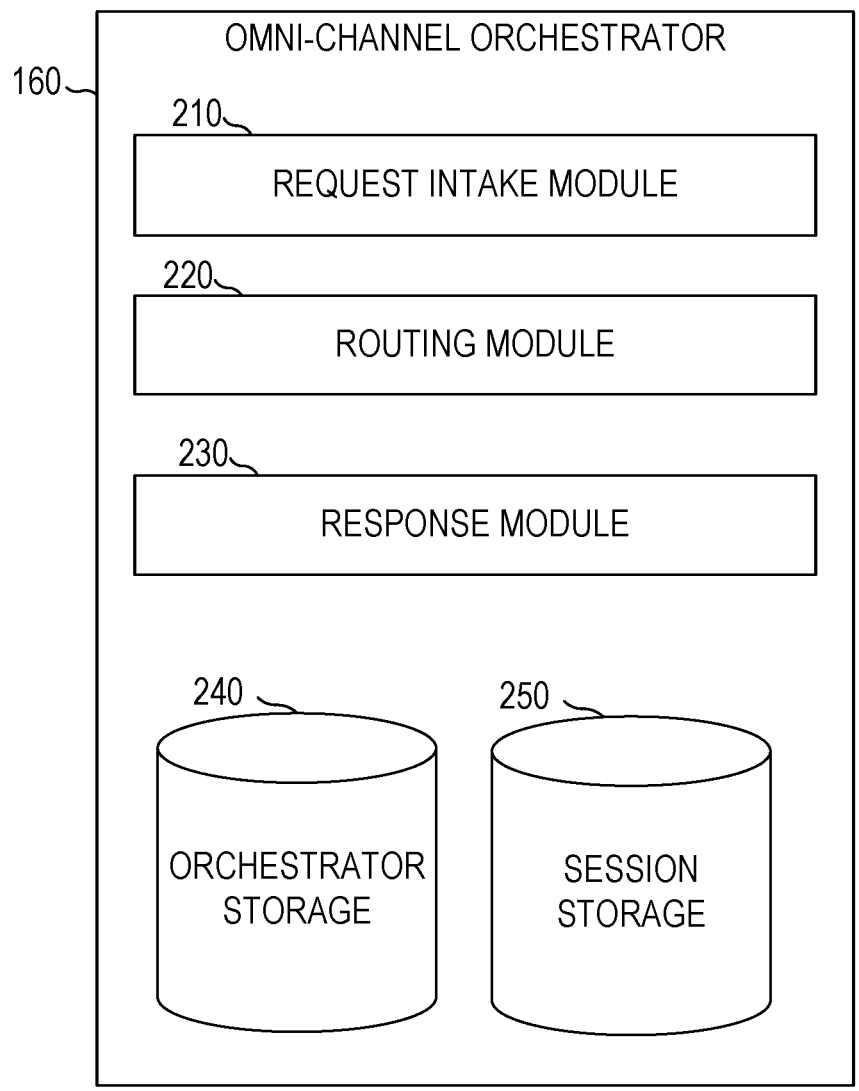
FIG. 2 is a system diagram of an omni-channel exchange system, according to some example embodiments.

FIG. 2 is a system diagram of the omni-channel orchestrator 160 of FIG. 1, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the omni-channel orchestrator 160 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the omni-channel orchestrator 160 includes a request intake module 210, a routing module 220, a response module 230, an orchestrator storage 240, and a session storage 250.

The request intake module 210 receives requests from the customer system 130 of FIG. 1. For example, the customer system 130 may send a request to make a phone call, send a text message, check a status of a communication session in progress, and the like. The routing module 220 routes the received request to an orchestrator that is determined based on the request. For example, the request may include an identifier of the channel. As another example, the request may include an identifier of a communication session and, by accessing data from the session storage 250, a channel for the communication session is determined.

The orchestrator storage 240 stores information related to the channel-specific orchestrators. For example, an IP address, a port number, an identifier of the channel supported by the orchestrator, or other information may be stored about each channel-specific orchestrator. When a request is received that identifies a channel, details about how to contact the corresponding channel-specific orchestrator may be accessed from the orchestrator storage 240.

The session storage 250 stores information related to sessions. For example, an identifier of the customer that created the session, an identifier of the channel of the session, a timestamp indicating when the session was created, a status indicating whether the session is active, or any suitable combination thereof may be stored for each session.

An administrator or other authorized user of the customer may use a client device 110 to communicate with the omni-channel orchestrator 160 and utilize the functionality provided by the omni-channel orchestrator 160. For example, the interface provided by the omni-channel orchestrator 160 may be presented on a display of the client device 110 and used by the administrator or other authorized user to send and receive messages using different channels.

The response module 230 responds to the received requests. For example, a request to send a message may be received by the request intake module 210 and routed to a channel-specific orchestrator by the routing module 220. Thereafter, the channel-specific orchestrator informs the omni-channel orchestrator 160 that the message was successfully sent (or, alternatively, that the message failed to be sent). The response module 230 informs the customer system 130 of the status of the message. As another example, the received request may be a request for a current status of a communication session. The response module 230 may access the status information from the session storage 250 and provide the requested information to the customer system 130 via the communication network 180.

FIG. 3 is a block diagram of an example database schema 300, suitable for storing data used by an omni-channel exchange system. The database schema 300 includes an orchestrator table 305, a session table 320, a session participants table 335, and an interaction table 350. The orchestrator table 305 includes rows 315A, 315B, 315C, 315D, and 315E of a format 310. The session table 320 includes rows 330A and 330B of a format 325. The session participants table 335 includes rows 345A, 345B, and 345C of a format 340. The interaction table 350 includes rows 360A and 360B of a format 355.

Each row of the orchestrator table 305 stores information for a channel-specific orchestrator. In the example of FIG. 3, the stored information is an identifier of the channel (e.g., voice, email, SMS, MMS, or RCS) and a uniform resource locator (URL) for communicating with the channel-specific orchestrator. In various example embodiments, more or less data for each channel may be stored than is shown in FIG. 3. For example, a port number to use to communicate with the channel-specific orchestrator, a latency of the channel-specific orchestrator, a cost of the channel-specific orchestrator, or any suitable combination thereof may be stored in the orchestrator table 305.

The rows of the session table 320 store data for communication sessions. A row may be added to the session table 320 when a session is instantiated. As shown in FIG. 3, each row includes a session identifier, a channel identifier, and a status of the communication session (e.g., active or inactive). In various example embodiments, more or less data for each channel may be stored. For example, an identifier of the customer that created the session, a time at which the session began, a cost of the session, a number of participants in the session, or any suitable combination thereof may be stored for each session.

The session participants table 335 stores data for the participants in a session. For example, the rows 345A-345C are all for the same session. Cross-referencing the session identifier of the session participants table 335 with the session identifier of the session table 320 reveals that the session of the rows 345A-345C is an active voice session. The participant identifiers may be cross-referenced with other tables to access participant information (e.g., name, address, phone number, email address, age, gender, or any suitable combination thereof).

The interaction table 350 stores data that relates multiple communication sessions. For example, the rows 360A-360B show that both the voice session with session ID 1 of the row 330A and the email session with session ID 2 of the row 330B are for the same interaction, the interaction with ID 100. Thus, data regarding the content of the communication sessions is interrelated via the shared interaction identifier, allowing for more efficient retrieval and access by users.

Figure 4:
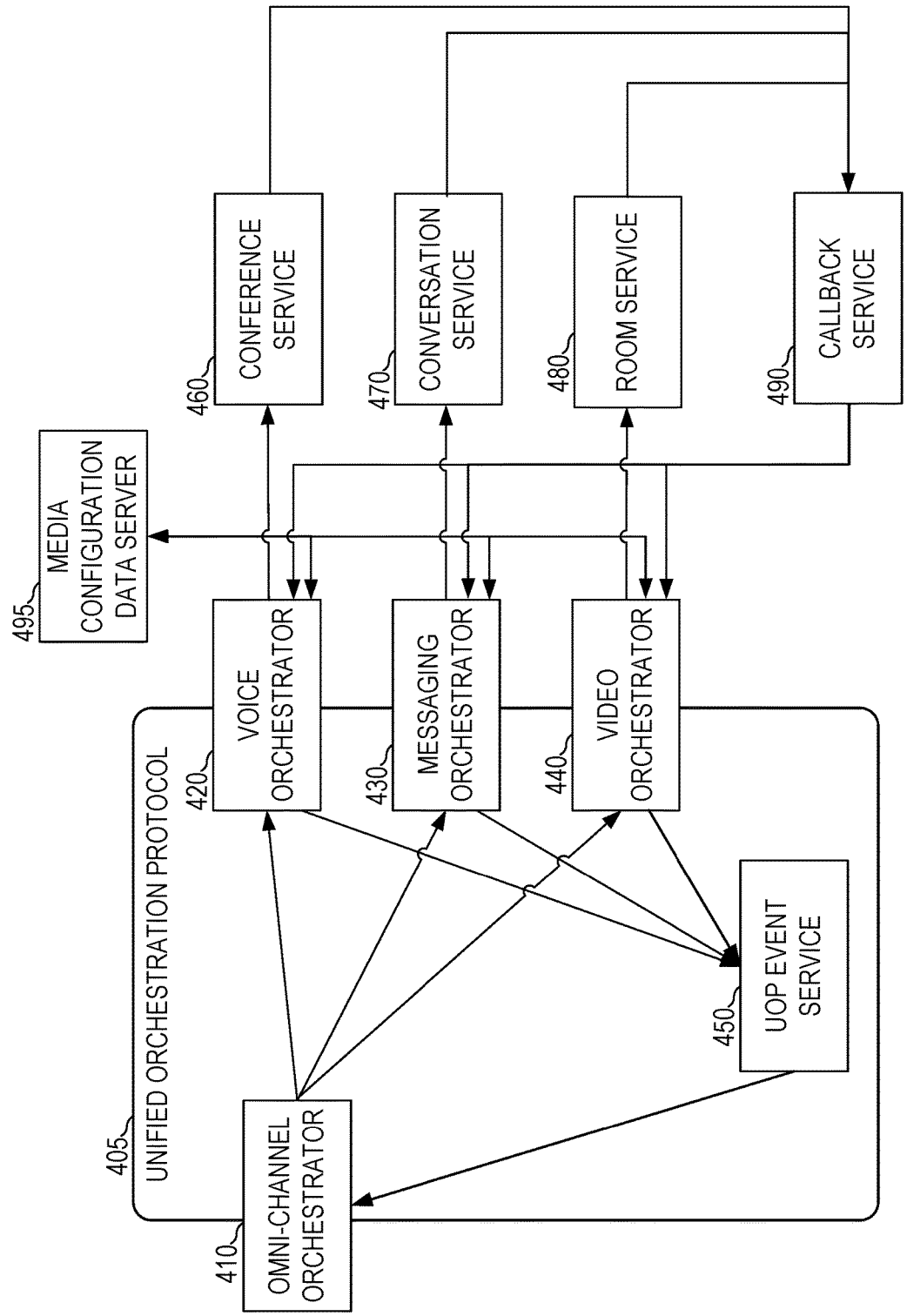
FIG. 4 is a communication flow diagram, showing communications among multiple components in providing an omni-channel interface to multiple communication channels, according to some example embodiments.

FIG. 4 is a communication flow diagram 400, showing communications among multiple components in providing an omni-channel interface to multiple communication channels, according to some example embodiments. The communication flow diagram 400 shows communications among an omni-channel orchestrator 410, a voice orchestrator 420, a messaging orchestrator 430, a video orchestrator 440, a unified orchestration protocol (UOP) event service 450, a conference service 460, a conversation service 470, a room service 480, a callback service 490, and a media configuration data server 495. The omni-channel orchestrator 410, the voice orchestrator 420, the messaging orchestrator 430, the video orchestrator 440, and the UOP event service 450 communicate using the UOP 405. The voice orchestrator 420, the messaging orchestrator 430, and the video orchestrator 440 may be referred to collectively as channel-specific orchestrators 420-440. The conference service 460, the conversation service 470, and the room service 480 may be referred to collectively as communication services 460-480.

The omni-channel orchestrator 410 sends a request to one of the channel-specific coordinators 420-440. The channel-specific coordinator sends a response to the omni-channel orchestrator 410 and sends one or more requests to the communication services 460-480. The service sends a response to the channel-specific coordinator and publishes one or more callbacks to the callback service 490. The callback service sends messages to the channel-specific coordinator with information about the communication session. The channel-specific coordinator publishes UOP events to the UOP event service 450. The omni-channel orchestrator 410 consumes the UOP events from the UOP event service 450.

For example, the omni-channel orchestrator 410 may receive a request from a customer system 130 of FIG. 1 to create a meeting. A meeting is a communication session between two or more devices. In response, the omni-channel orchestrator 410 may send a Representational State Transfer (REST) request to the voice orchestrator 420, requesting the voice orchestrator 420 to create a meeting. The voice orchestrator 420 responds to the omni-channel orchestrator 410 with a REST response indicating that the request was accepted. The voice orchestrator 420 also sends a REST request to the conference service 460 to create a conference. The conference service 460 responds to the voice orchestrator 420 with a REST response acknowledging the request. The conference service 460 uses the callback service 490 to send further communications to the voice orchestrator 420. For example, the voice orchestrator 420 may be informed when the conference starts by receiving a hypertext transport protocol (HTTP) callback from the callback service 490.

Continuing with this example, the voice orchestrator 420 may publish UOP events (e.g., meeting started) to the UOP event service 450. The omni-channel orchestrator 410 may receive UOP notifications from the UOP event service 450. Based on the received UOP notifications, the omni-channel orchestrator 410 may send additional requests to the voice orchestrator 420, send status information to the customer system 130, store data in the orchestrator storage 240 of FIG. 2, store data in the session storage 250 of FIG. 2, or any suitable combination thereof.

In one example embodiment, the API for the voice orchestrator 420 may be defined as follows:

The UOP REST API may include voice-specific properties and other channel-specific properties. When these properties are included in requests from the customer system 130, the omni-channel orchestrator 410 includes the properties in requests to the corresponding channel-specific orchestrator and removes them from requests to other channel-specific orchestrators. Below is a table of properties for voice conferences.

| Meeting media properties (voice conference) | | |
|---|---|---|
| region | string ("ie1") | |
| max participants | int | |
| trim | string ("do-not-trim") | |
| status callback | string | |
| (URL, method, and events) | events: "join leave mute hold" | |
| recording | string | |
| (duration, URL, method, and events) | duration: "record-from-start" events: "in-progress completed" | |
| Participant media properties | | |
| from, to | string | |
| ring timeout | int | |
| call status callback | string | |
| (URL, method, and events) | events: "ringing answered" | |
| call record callback | string | |
| (URL, method, and channels) | channels: "mono" | |
| SIP username and password | string | |
| muted, hold | boolean | These values can change in the middle of a conference. |

| -continued | | |
|---|---|---|
| end conference on exit, start conference on enter, early media | boolean | end conference on exit changes today, but we should not allow it |
| beep | string ("onEnter") | |
| coaching enabled, call sid to coach | boolean, call sid | Unused today but we may need to use this for whisper |
| wait music (URL and method) | string | |
| hold music (URL and method) | string | Can this value change in the middle of a conference? |
| announcement (URL and method) | string | Can this value change in the middle of a conference? |
| beep on exit | boolean | |

Below are video media properties and conversations media properties for comparison.

| Meeting media properties (video room) | |
|---|---|
| enable turn | boolean |
| Type | string ("small-group") |
| unique name | string |
| max participants | int |
| media region | string ("ie1") |
| status callback (URL and method) | string |
| record participants on connect | boolean |
| video codecs | string ("VP8") |
| Status | string ("completed") |

| Participant media properties | |
|---|---|
| Status | string ("disconnected") |

| Meeting media properties (conversations) | | |
|---|---|---|
| friendly name | boolean | |
| date created and updated | string | |
| messaging service sid | string | |
| Attributes | json string | Can this value change in the middle of a conversation? |

| Participant media properties | | |
|---|---|---|
| Identity | string | |
| messaging binding | string | |
| (address, proxy address, and projected address) | | |
| Attributes | json string | Can this value change in the middle of a conversation? |
| date created and updated | string | |

Orchestrator events are sent from media orchestrators to publish updates on the status of Meeting, Participant, or Transfer. Some orchestrator events contain the Raw Media Event field, which captures a channel-specific callback in a JavaScript object notation (JSON) blob. For example, a callback from voice would include voice-specific media properties such as the ConferenceSid, CallSid, and values like EndConferenceOnExit.

| Required fields | Optional fields |
|---|---|
| Account Sid | Participant Sid |
| Meeting Sid | Transfer Sid |
| Event Sid | Transferor Participant Sid |
| Event Type | Transferee Participant Sid |
| Timestamp | Raw Media Event |
| | Error Message |
| | Error Code |

| Event Type | Included optional fields | TaskRouter action/ conference state event |
|---|---|---|
| Meetings | | |
| meeting-initiated | — | — |
| meeting-started | Raw media event | Conference Start Event |
| meeting-succeeded | — | Accept reservation (agent) |
| meeting-failed | Error message and error code | Cancel reservation (agent) |
| meeting-ended | Raw media event | Conference End Event |
| meeting-completed | — | Terminate task |
| Participants | | |
| participant-added | Participant sid, raw media event | Participant Join Event & Accept reservation (2nd agents) |
| participant-modified | Participant sid, raw media event | Participant Hold/Unhold/ Mute/ Unmute Event |
| participant-removed | Participant sid, raw media event | Participant Leave Event & Wrap up reservation |
| participant-add-failed | Participant sid, Error msg + code | Cancel reservation |
| participant-modify-failed | Participant sid, Error msg + code | — |
| participant-remove-failed | Participant sid, Error msg + code | — |

-continued

| Event Type | Included optional fields | TaskRouter action/ conference state event |
|---|---|---|
| Transfers | | |
| transfer-initiated | Transfer sid, transferor sid | — |
| transfer-canceled | Transfer sid, transferor sid | — |
| transfer-cancel-failed | Transfer sid, transferor sid Error message and code | — |
| transfer-succeeded | Transfer sid, transferor sid, transferee sid | — |
| transfer-failed | Transfer sid, transferor sid, transferee sid, error msg + code | — |

For UOP to work across different orchestrators, channel-specific properties are removed from it. Channel-specific properties can be divided into different types: Type 1, properties that tell us how to reach a participant such as the source and destination phone numbers (also referred to as "from" and "to") for a voice connection, or identity or messagingBinding for chat communications; and Type 2, properties set at meeting or participant creation. Meeting properties fall in this category, like region and max participants. Also, fixed participant properties for participant types (e.g., supervisors, agents, and users). For example, supervisors may receive media but not send media while monitoring and agents may hear the same wait music or prompt while waiting for other users to join.

Type 3 properties are media properties that can change during a meeting. For example, participants can be muted or put on hold, announcements or prompts can change during the course of a meeting, and participant privileges like EndConferenceOnExit can change.

Removing the channel-specific types of media properties from UOP means that the channel-specific orchestrators 420-440 need to be able to fetch these properties upon request to create a meeting or add a new participant. Each type of property lends itself to a different solution for how media orchestrators can fetch the information.

For example, type 1 properties that allow a participant to be reached can be included by the omni-channel orchestrator 410 so that the channel-specific orchestrator has the property data when it is needed. Alternatively, an identifier of the participant may be passed as an argument to a URL and one or more type 1 properties received in response.

Type 2 properties that are set at meeting or participant creation may be stored as meeting configurations in the media configuration data server 495. The configurations may be structured according to channel-specific definitions and accessed by the channel-specific orchestrators 420-440 from the media configuration data server 495 (e.g., using a GET HTTP request).

Type 3 properties can be set by the customer during the meeting. For example, the customer may request a participant to be put on hold (or released from hold) or muted (or unmuted). The customer system 130 of FIG. 1 may send requests to the omni-channel orchestrator 410 during the meeting to change type 3 properties. Hold/unhold toggles participant's ability to receive media from others in a meeting. Mute/unmute toggles participant's ability to send media to others in a meeting. Hold or mute payload can be sent via an omni-channel SDK, which will be passed onto the UOP REST API by the omni-channel orchestrator 410. An example payload for voice calls is an opaque JSON blob like {"holdUrl":"http://twilio.com/cowbell.mp3"} or a token to fetch a media configuration from the media configuration data server 495.

Announcements and prompts are also type 3 properties. The customer may configure additional announcements and prompts in the media configuration data server 495. Each announcement or prompt is assigned a unique identifier. When requesting that an announcement or prompt is played into the meeting, the customer system 130 provides the unique identifier to the omni-channel orchestrator 410, which provides the unique identifier to the channel-specific orchestrator 420-440, which uses the unique identifier to retrieve the announcement or prompt from the media configuration data server 495.

Some participant privileges may be handled by the customer system 130 rather than the omni-channel orchestrator 410 or the channel-specific orchestrators 420-440. For example, if the conference should end when a particular participant leaves the meeting (e.g., with an EndConferenceOnExit property), the customer can determine when to send a request to the omni-channel orchestrator 410 to end the conference.

The media configuration data server 495 stores customer's static configurations regarding channels like voice conferences, video rooms, and messaging conversations. The channel-specific orchestrators 420-440 fetch these configurations when creating a new meeting or adding a new participant to a meeting. An example request and response are shown below.

```
GET /MediaConfigurations?type=voice&target=meeting
I-Twilio-Auth-Account: AC123
200 OK
{
  "maxParticipants": 10,
  "region": "us1",
  "statusCallback": "http://somewhere.com/callback"
}
```

The two filters in this example are type and target. The type identifies the channel. In some example embodiments, the type is a required filter. Possible values for the type filters are "voice," "video," and "messaging." The target indicates whether the request includes configuration data for a meeting or for a participant. Possible values for the target filter are zero or one of "meeting," "agent," "customer," and "supervisor." In some example embodiments, if no filter is specified, the request is responded to with all targets for the given type.

For each account, the media configuration data server 495 stores the static configurations for each channel. The following is an example JSON blob for a particular account:

```
"voice": {
  "meeting": {
    "maxParticipants": 10,
    "region": "us1",
    "statusCallback":
"http://somewhere.com/callback",
  },
  "participant-common": {
    "endConferenceOnExit": false,
    "callStatusCallback": "customer.com/callback",
    "ringTimeout": 15s,
    "mute": false
  },
  "agent": {
    "waitUrl": "flex-ring.mp3"
  },
  "customer": {
    "ringTimeout": 60s
  },
  "supervisor": {
    "mute": true
  }
},
"video": {
  "meeting": {
    "maxParticipants": 10,
    "videoCodecs": [ ]
  },
  "participant-common": { },
  "agent": { },
```

-continued

```
    "customer": { },
    "supervisor": { }
  },
  "messaging": {
    "meeting": {
      "messagingServiceSid": "MG123"
    },
    "participant-common": { },
    "agent": { },
    "customer": { },
    "supervisor": { }
  }
}
```

Participant-common contains a set of configuration values that are shared across different participants in a meeting. Agent, customer, supervisor each contain configurations that are specific to the target and it augments or overrides (in case of duplicate config key) the values in participant-common.

The following is an example implementation of the UOP REST API.

In some example embodiments, orchestrator events handled by the UOP event service 450 include, but are not limited to, one or more of the following fields: account ID, meeting ID, event ID, event type, timestamp, participant ID, transfer ID, transferor participant ID, transferee participant ID, error message, and error code.

| Event Type | Included optional fields | TaskRouter action |
|---|---|---|
| Meetings | | |
| meeting-started | — | — |
| meeting-succeeded | — | Accept reservation (agent) |
| meeting-failed | Error message and error code | Cancel reservation (agent) |
| meeting-completed | — | Terminate task |
| Participants | | |
| participant-added | Participant sid | Accept reservation (2nd agents) |
| participant-modified (For Hold/Unhold/ Mute/Unmute actions) | Participant sid | — |
| Participant-removed | Participant sid | Wrap up reservation |
| participant-add-failed | Participant sid, Error msg + code | Cancel reservation |
| participant-modify-failed (For Hold/Unhold/ Mute/Unmute actions) | Participant sid, Error msg + code | — |
| participant-remove-failed | Participant sid, Error msg + code | — |
| Transfers | | |
| transfer-initiated | Transfer sid, transferor sid | — |
| transfer-canceled | Transfer sid, transferor sid | — |
| transfer-cancel-failed | Transfer sid, transferor sid Error message and code | — |
| transfer-succeeded | Transfer sid, transferor sid, transferee sid | — |
| transfer-failed | Transfer sid, transferor sid, transferee sid, error msg + code | — |

The customer system 130 may interact with the omni-channel orchestrator 410 using a different API, an example of which is shown below.

---
POST/v1/Interactions
Creates a new task with routing requirements based on direction of the channel. Also creates a meeting to represent the communication channel for the communication session.
---

| Param | Sub-fields | Description |
|---|---|---|
| channel[required] | | Json object representing media channel attributes for the communication session. |
| | type [required] | Channel type Values: email or voice → task attribute: channelType |
| | initiated_by [required] | Who is creating this communication session Values: customer agent api → task attribute: initiatedBy |
| | properties [required] | Channel properties sent over to media orchestrators for validation and consumption. FO does not process this blob. For customer-initiated email: type, media_channel_sid fields type: email media_channel_sid: conversation sid For agent- or api-initiated email: type, from, from_name fields type: email from: email address of contact center team (e.g. support@twilio.com) from_name: name of contact center team (e.g. Twilio Support) |
| | participants [optional] | List of channel participant properties. Customers only, no agent properties. For email: level, name, address, ~~identity~~ ,type fields level: to, cc, bcc name: email participant's display name address: email participant's address type: enum of media types. In this case, email. FO does not consume this blob. Participants is not needed for inbound but is required for outbound. |
| routing[required] | | Json object representing agent routing information for the communication session |
| | type [required] | Routing type Values: taskrouter |
| | properties [required] | Fields needed to create a task workspace_sid [required] workflow_sid [optional] task_channel_sid [optional] task_channel_unique_name [optional] worker_sid [required for outbound] attributes [required]: task attributes {"customerName": [required] for UI "customerAddress": [required] for UI} |

An example outbound request is:

```
{
  "channel":{
    "type":"EMAIL",
    "initiated_by": "agent",
    "properties":{
      "type": "email",
      "from_name": "Twilio Support",
      "from": "support@twilio.com"
    },
    "participants": [
      {
        "level": "to",
        "name": "Random Person",
        "address":"random@person.com",
        "type": "email"
      }
    ]
  },
  "routing":{
    "type":"TASKROUTER",
    "properties":{
      "workspace_sid":"WSxxx",
      "workflow_sid":"WWxxx",
      "attributes":{
        "customerName": "customer",
        "customerAddress": "customer@customer.com"
      },
      "task_channel_unique_name":"email",
      "worker_sid": "WKxxx"
    }
  }
}
```

An example response is:

```
200 OK
{
  "sid": "KDxx",
  "channel": {
    "type": "EMAIL"
  },
  "routing": {
    "type": "TASKROUTER",
    "properties": {
      "account_sid": "ACxxx",
      "workspace_sid": "WSxxx",
      "sid": "WTxxx",
      "date_created": 1620664078,
      "date_updated": 1620664078,
      "attributes":
"{\"initiated_by\":\"agent\",\"senderName\":\"Random Person\",\"senderAddress\":\"random@person.com\",\"conversationSid\":\"CHxxx\",\"channelType\":\"email\",\"conversations\":{\"conversation_sid\":\"CHxxx\",\"initiated_by\":\"agent\",\"communication_channel\":\"email\",\"media\":[{\"conversation_sid\":\"CHxxx\",\"type\":\"EmailTranscript\"}],\"external_contact\":\"support@twilio.com\",\"direction\":\"outbound\"},\"direction\":\"outbound\"}"
,
      "assignment_status": "pending",
      "workflow_sid": "WWxxx",
      "workflow_name": "Assign to Anyone",
      "queue_sid": "WQxxx",
      "queue_name": "Everyone",
      "priority": 0,
      "age": 0,
      "reason": null,
      "timeout": 86400,
      "assignmentCounter": 0,
      "task_channel_sid": "TCxxx",
      "task_channel_unique_name": "default",
      "routing_target": null,
      "task_queue_entered_date": 1620664078,
      "age_in_queue": 0,
      "addons": "{ }"
    }
  }
}
```

Figure 5:
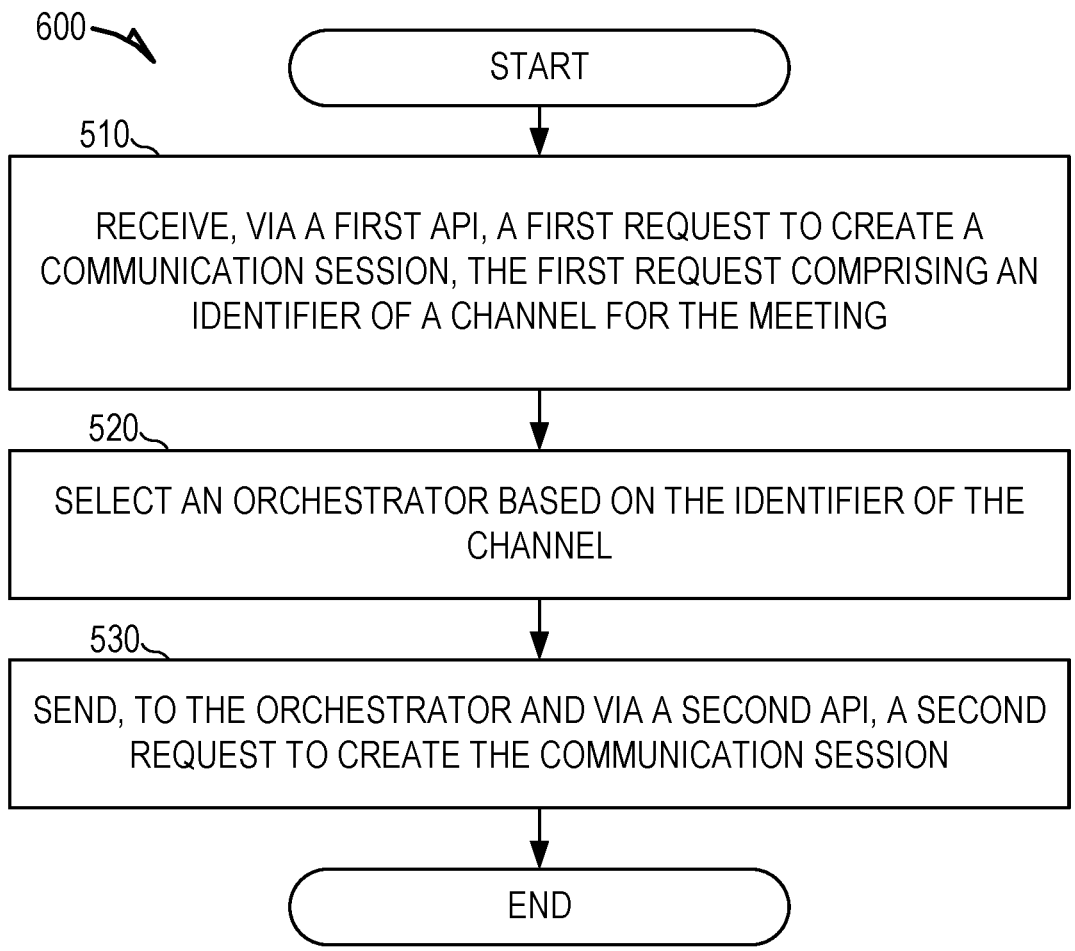
FIG. 5 is a flowchart showing a method for creating a communication session with an omni-channel adapter, according to some example embodiments.

FIG. 5 is a flowchart showing a method 500 for creating a communication session with an omni-channel adapter, according to some example embodiments. The method 500 may be embodied in computer readable instructions for execution by one or more processors such that the operations of the method 500 may be performed in part or in whole by the omni-channel orchestrator 160 of FIG. 1; accordingly, the method 500 is described below by way of example with reference thereto. However, it shall be appreciated that at least some of the operations of the method 500 may be deployed on various other hardware configurations and the method 500 is not intended to be limited to the omni-channel orchestrator 160.

In operation 510, the request intake module 210 of FIG. 2 receives a request to create a communication session. The request is received via a first API and comprises an identifier of a channel for the communication session. For example, the request intake module 210 of FIG. 2 may receive the request via the Interactions API described above from a customer system 130 of FIG. 1 via the communication network 180 of FIG. 1. The request may include an identifier of a channel type, such as voice or email.

The request may include data identifying the customer, data identifying the intended recipient, channel data, a payload of the message, or any suitable combination thereof. For example, the request may include a unique identifier assigned to the customer and/or the customer's account with the omni-channel orchestrator 160. The request may also include an identifier for the recipient of the message, such as a phone number associated with a recipient client device 110 of FIG. 1, an account of the omni-channel orchestrator 160 associated with the recipient, or both. The payload may include text, image, a rich media format of data and/or any combination of data formats but not limited to the above formats to be included in the message provided to the recipient. The request may identify a single channel to be used to send the message, an allowed list of channels that may be used for the message, a blocked list of channels that may not be used for the message, or any suitable combination thereof.

In operation 520, the omni-channel orchestrator 160 selects an orchestrator based on the identifier of the channel. For example, the identifier of the channel may be used to look up the corresponding orchestrator from the orchestrator table 305 of FIG. 3. In some example embodiments, the channel is a voice channel, and the orchestrator is the voice orchestrator 420 of FIG. 4, or the channel is a text channel and the orchestrators is the messaging orchestrator 430 of FIG. 4.

The omni-channel orchestrator 160 sends, to the orchestrator and via a second API, a second request to create the communication session (operation 530). For example, the UOP may be used to send the second request to one of the channel-specific orchestrators 420-440. The second request may include the identifier of the customer. The channel-specific orchestrator 420-440 creates the requested communication session (e.g., using the conference service 460) and responds to the omni-channel orchestrator 410, either directly or via the UOP event service 450. The response from the channel-specific orchestrator 420-440 may include a unique identifier for the communication session, an interaction, or both. For example, the communication session may be a first communication session of an interaction and an entry to the session table 320 may be created for the communication session and an entry in the interaction table 350 may be created to link the communication session to a new interaction. As another example, the request received in operation 510 may have included an interaction identifier and a new row added to the interaction table 350 that links the new communication session to the existing interaction. The omni-channel orchestrator 410 may provide the identifier or identifiers to the customer system 130, for use in later communications from the customer system 130 to the omni-channel orchestrator 410 regarding the communication session.

Prior to commencing the method 500, the customer system 130 may have provided configuration data in conjunction with the customer identifier to the omni-channel orchestrator 410 or to the media configuration data server 495. In some example embodiments, the omni-channel orchestrator 160 provides the functionality of the media configuration data server 170. In other example embodiments, they are two separate systems. In the latter embodiments, the omni-channel orchestrator 410 may provide the configuration data to the media configuration data server 495. The channel-specific orchestrator 420-440 may request the configuration data from the media configuration data server 495 by sending a request that includes the identifier of the customer. The media configuration data server 495 receives the request and responds to the request with the configuration data. As a result, the channel-specific orchestrator 420-440 may use the configuration settings of the customer in creating the communication session.

After a communication session is created using the method 500, additional requests may be received by the omni-channel orchestrator 410 from the customer system 130. The additional requests may include an identifier of the communication session that can be used by the omni-channel orchestrator 410 to access state information (e.g., the channel, the participants, or both) of the communication session. For example, the omni-channel orchestrator 410 may receive, via the first API, a third request to end the communication session, the third request including the identifier of the communication session. In response to receiving the third request, the omni-channel orchestrator 410 identifies the channel-specific orchestrator 420-440 based on the identifier of the communication session (e.g., by accessing data from the session table 320). The omni-channel orchestrator 410 sends a fourth request to the identified channel-specific orchestrator 420-440, via the second API, to end the communication session.

As another example of a request that could be sent after the communication session is created, the omni-channel orchestrator 410 may receive, from the customer system 130 and via the first API, a third request to add a participant to the communication session, the first request comprising an identifier of the communication session. In response to receiving the third request, the omni-channel orchestrator 410 identifies the channel-specific orchestrator 420-440 based on the identifier of the communication session (e.g., by accessing data from the session table 320). The omni-channel orchestrator 410 sends a fourth request to the identified channel-specific orchestrator 420-440, via the second API, to add the participant to the communication session.

As a further example of a request that could be sent after the communication session is created, the omni-channel orchestrator 410 may receive, from the customer system 130 and via the first API, a request to mute a participant to the communication session, the request comprising an identifier of the communication session. In response to receiving the request, the omni-channel orchestrator 410 identifies the channel-specific orchestrator 420-440 based on the identifier of the communication session (e.g., by accessing data from the session table 320). The omni-channel orchestrator 410 sends a further request to the identified channel-specific orchestrator 420-440, via the second API, to mute the participant.

Thus, by use of the method 500, a customer is enabled to communicate with multiple channel-specific orchestrators using a single interface point. The method 500 may be repeated multiple times, by the same customer or different customers, creating communication session using the same channel or different channels. Thus, a single customer may perform the method 500 twice, providing a different channel identifier in each of the repetitions of operation 510, causing the omni-channel orchestrator 410 to communicate with different channel-specific orchestrators 420-440 in each of the repetitions of operations 520-530.

Figure 6:
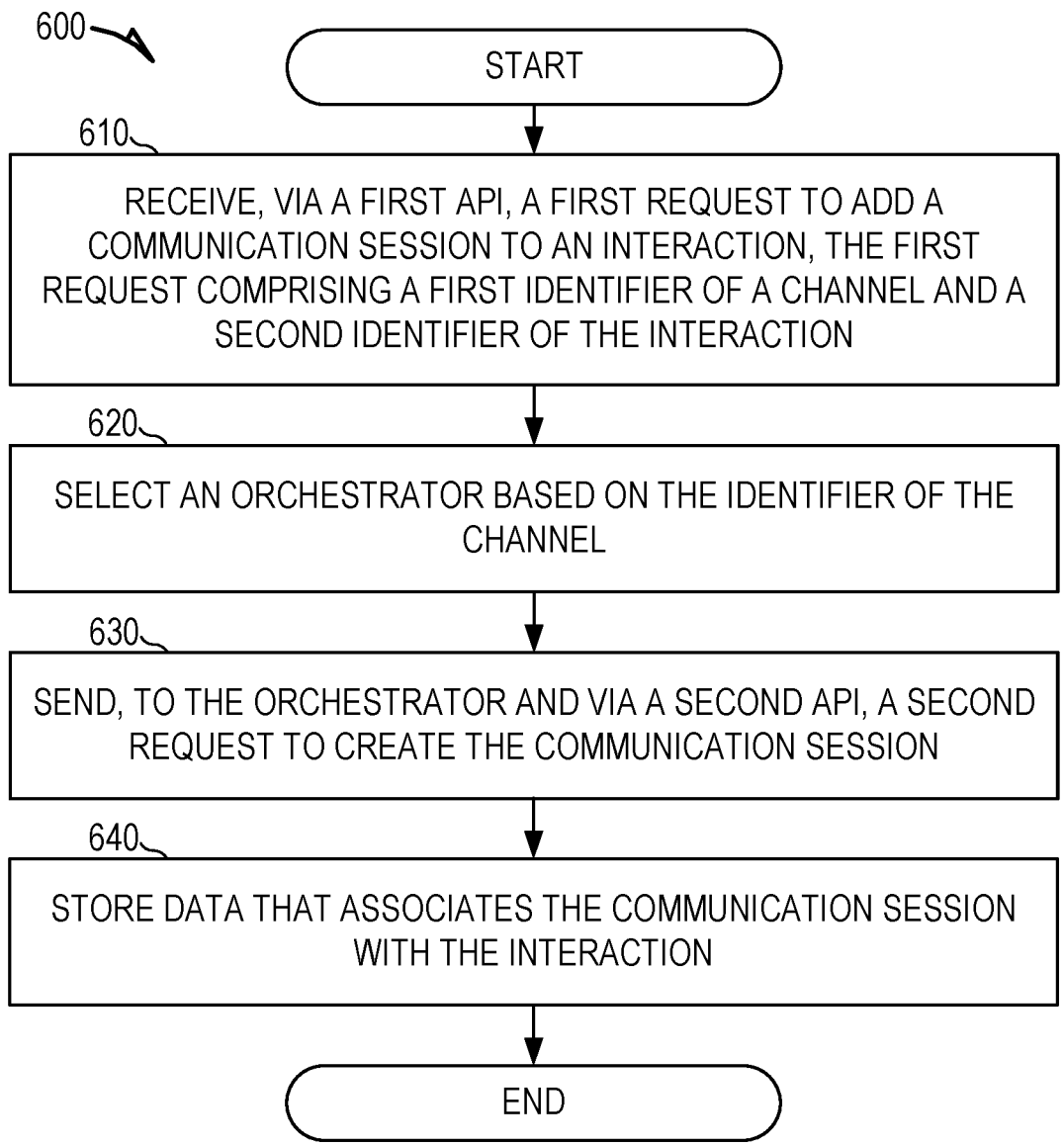
FIG. 6 is a flowchart showing a method for adding a communication session to an interaction with an omni-channel adapter, according to some example embodiments.

FIG. 6 is a flowchart showing a method 600 for adding a communication session to an interaction with an omni-channel adapter, according to some example embodiments. The method 600 may be embodied in computer readable instructions for execution by one or more processors such that the operations of the method 600 may be performed in part or in whole by the omni-channel orchestrator 160 of FIG. 1; accordingly, the method 600 is described below by way of example with reference thereto. However, it shall be appreciated that at least some of the operations of the method 600 may be deployed on various other hardware configurations and the method 600 is not intended to be limited to the omni-channel orchestrator 160.

In operation 610, the omni-channel orchestrator 160 receives, via a first API, a first request to add a communication session to an interaction, the first request comprising a first identifier of a channel and a second identifier of the interaction. For example, the method 500 may have been used to create the session of the row 330A of the session table 320 and the row 360A of the interaction table 350. Thereafter, a request to add an email communication is received by the omni-channel orchestrator 160. The request comprises an identifier of the channel (email) and an identifier of the interaction (e.g., the identifier 100 of the row 360A).

Operations 620 and 630 may be performed in a similar manner to operations 520 and 530, described above with respect to FIG. 5. Thus, a new communication session is created using a channel-specific orchestrator.

In operation 640, the omni-channel orchestrator 160 stores data that associates the communication session with the interaction. For example, the row 360B may be stored, associating the email communication session created in operation 530 with the existing interaction of the voice communication session. Thus, communication sessions using additional channels may be added to existing interactions.

In view of the above-described implementations of subject matter, this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: one or more processors; and a memory that stores instructions that, when executed by the one or more processors, cause the one or more processors to perform operations comprising: receiving, via a first application programming interface (API), a first request to create a communication session, the first request comprising an identifier of a channel for the communication session; selecting a communication orchestrator based on the identifier of the channel; sending, to the communication orchestrator and via a second API, a second request to create the communication session; and creating, by the communication orchestrator, the communication session.

In Example 2, the subject matter of Example 1 includes, wherein: the channel comprises one of a voice channel, a video channel, and a text channel; and the selecting of the communication orchestrator comprises selecting among a voice orchestrator, a video orchestrator, and a text orchestrator.

In Example 3, the subject matter of Examples 1-2, wherein: the first request further comprises an identifier of a customer; the second request includes the identifier of the customer; and the operations further comprise: storing configuration data associated with the customer identifier; receiving a third request from the communication orchestrator, the third request including the identifier of the customer; and responding to the third request with the configuration data.

In Example 4, the subject matter of Examples 1-3, wherein the operations further comprise: receiving, via the first API, a third request to create a second communication session, the third request comprising an identifier of a second channel for the second communication session; selecting a second communication orchestrator based on the identifier of the second channel, the second communication orchestrator being different than the communication orchestrator; and sending, to the second communication orchestrator and via a third API, a fourth request to create the second communication session.

In Example 5, the subject matter of Examples 1-4, wherein the operations further comprise: receiving, via the first API, a third request to end the communication session, the first request comprising an identifier of the communication session; identifying the communication orchestrator based on the identifier of the communication session; and sending, to the communication orchestrator and via the second API, a fourth request to end the communication session.

In Example 6, the subject matter of Examples 1-5, wherein the operations further comprise: receiving, via the first API, a third request to add a participant to the communication session, the first request comprising an identifier of the communication session; identifying the communication orchestrator based on the identifier of the communication session; and sending, to the communication orchestrator and via the second API, a fourth request to add the participant to the communication session.

In Example 7, the subject matter of Example 6, wherein the operations further comprise: receiving, via the first API, a fifth request to mute the participant; and sending, to the communication orchestrator and via the second API, a sixth request to mute the participant.

Example 8 is a non-transitory machine-readable medium that stores instruction that, when executed by one or more processors, cause the one or more processors to perform operations comprising: receiving, via a first application programming interface (API), a first request to create a communication session, the first request comprising an identifier of a channel for the communication session; selecting a communication orchestrator based on the identifier of the channel; sending, to the communication orchestrator and via a second API, a second request to create the communication session; and creating, by the communication orchestrator, the communication session.

In Example 9, the subject matter of Example 8, wherein: the channel is a voice channel or a text channel; and the selecting of the communication orchestrator selects between a voice orchestrator and a text orchestrator.

In Example 10, the subject matter of Examples 8-9, wherein: the first request further comprises an identifier of a customer; the second request includes the identifier of the customer; and the operations further comprise: storing configuration data associated with the customer identifier;

receiving a third request from the communication orchestrator, the third request including the identifier of the customer; and responding to the third request with the configuration data.

In Example 11, the subject matter of Examples 8-10, wherein the operations further comprise: receiving, via the first API, a third request to create a second communication session, the third request comprising an identifier of a second channel for the second communication session; selecting a second communication orchestrator based on the identifier of the second channel, the second communication orchestrator being different than the communication orchestrator; and sending, to the second communication orchestrator and via a third API, a fourth request to create the second communication session.

In Example 12, the subject matter of Examples 8-11, wherein the operations further comprise: receiving, via the first API, a third request to end the communication session, the first request comprising an identifier of the communication session; identifying the communication orchestrator based on the identifier of the communication session; and sending, to the communication orchestrator and via the second API, a fourth request to end the communication session.

In Example 13, the subject matter of Examples 8-12, wherein the operations further comprise: receiving, via the first API, a third request to add a participant to the communication session, the first request comprising an identifier of the communication session; identifying the communication orchestrator based on the identifier of the communication session; and sending, to the communication orchestrator and via the second API, a fourth request to add the participant to the communication session.

In Example 14, the subject matter of Example 13, wherein the operations further comprise: receiving, via the first API, a fifth request to mute the participant; and sending, to the communication orchestrator and via the second API, a sixth request to mute the participant.

Example 15 is a method comprising: receiving, by one or more processors and via a first application programming interface (API), a first request to create a communication session, the first request comprising an identifier of a channel for the communication session; selecting a communication orchestrator based on the identifier of the channel; sending, to the communication orchestrator and via a second API, a second request to create the communication session; and creating, by the communication orchestrator, the communication session.

In Example 16, the subject matter of Example 15, wherein: the channel comprises one of a voice channel, a video channel, and a text channel; and the selecting of the communication orchestrator comprises selecting among a voice orchestrator, a video orchestrator, and a text orchestrator.

In Example 17, the subject matter of Examples 15-16, wherein: the first request further comprises an identifier of a customer; the second request includes the identifier of the customer; and the operations further comprise: storing configuration data associated with the customer identifier; receiving a third request from the communication orchestrator, the third request including the identifier of the customer; and responding to the third request with the configuration data.

In Example 18, the subject matter of Examples 15-17 includes receiving, via the first API, a third request to create a second communication session, the third request comprising an identifier of a second channel for the second communication session; selecting a second communication orchestrator based on the identifier of the second channel, the second communication orchestrator being different than the communication orchestrator; and sending, to the second communication orchestrator and via a third API, a fourth request to create the second communication session.

In Example 19, the subject matter of Examples 15-18 includes receiving, via the first API, a third request to end the communication session, the first request comprising an identifier of the communication session; identifying the communication orchestrator based on the identifier of the communication session; and sending, to the communication orchestrator and via the second API, a fourth request to end the communication session.

In Example 20, the subject matter of Examples 15-19 includes receiving, via the first API, a third request to add a participant to the communication session, the first request comprising an identifier of the communication session; identifying the communication orchestrator based on the identifier of the communication session; and sending, to the communication orchestrator and via the second API, a fourth request to add the participant to the communication session.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Software Architecture

Figure 7:
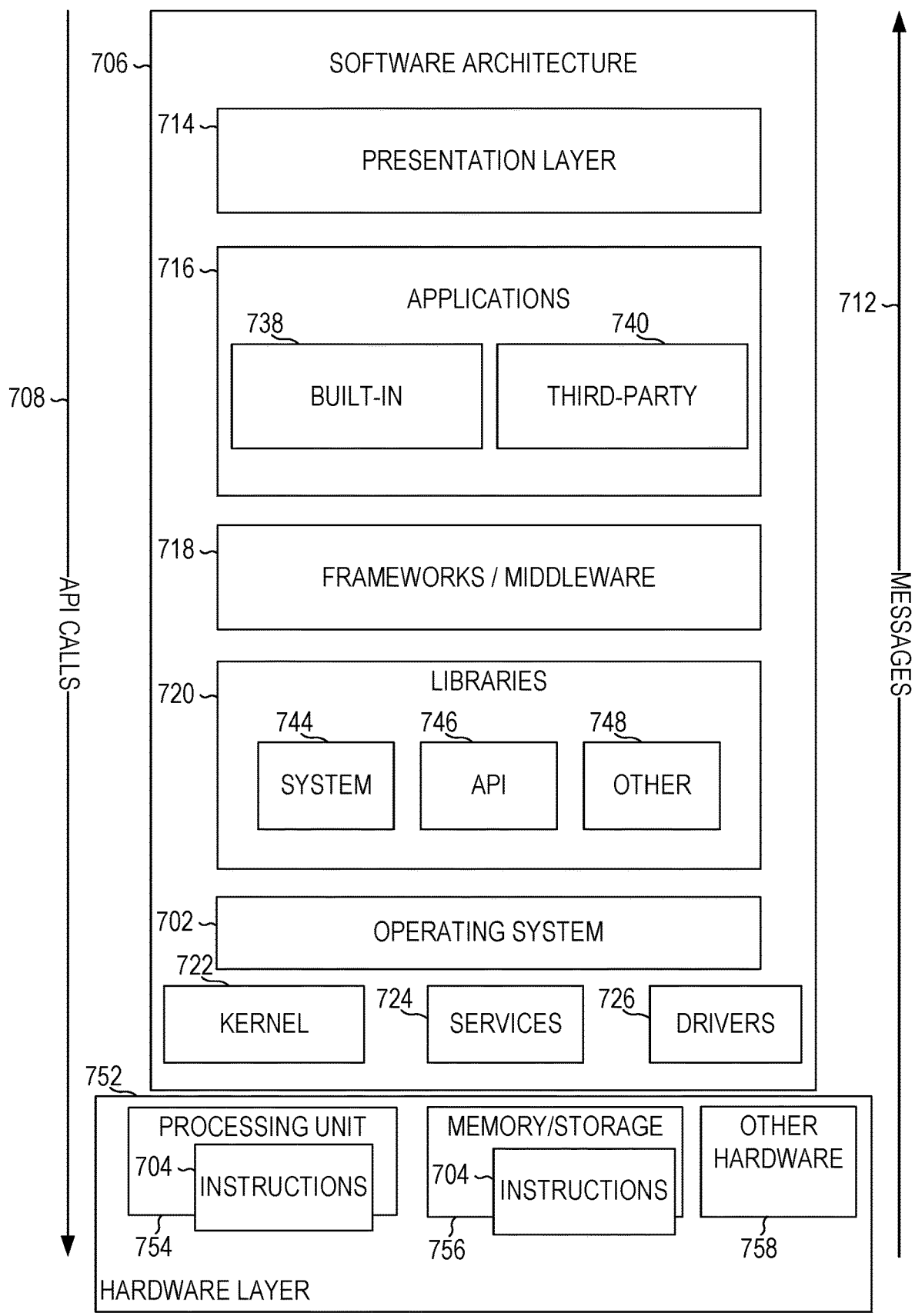
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating an example software architecture 706, which may be used in conjunction with various hardware architectures herein described. FIG. 7 is a non-limiting example of a software architecture 706 and it will be appreciated that many other architectures may be implemented to facilitate the functionality described herein. The software architecture 706 may execute on hardware such as machine 800 of FIG. 8 that includes, among other things, processors 810, memory 830, and (input/output) I/O components 850. A representative hardware layer 752 is illustrated and can represent, for example, the machine 800. The representative hardware layer 752 includes a processing unit 754 having associated executable instructions 704. Executable instructions 704 represent the executable instructions of the software architecture 706, including implementation of the methods, components, and so forth described herein. The hardware layer 752 also includes memory and/or storage modules 756, which also have executable instructions 704. The hardware layer 752 may also comprise other hardware 758.

In the example architecture of FIG. 7, the software architecture 706 may be conceptualized as a stack of layers where each layer provides a particular functionality. For example, the software architecture 706 may include layers such as an operating system 702, libraries 720, frameworks/middleware 718, applications 716, and a presentation layer 714. Operationally, the applications 716 and/or other components within the layers may invoke API calls 708 through the software stack and receive a response such as messages 712 in response to the API calls 708. The layers illustrated are representative in nature and not all software architectures have all layers. For example, some mobile or special purpose operating systems may not provide a frameworks/ middleware 718, while others may provide such a layer. Other software architectures may include additional or different layers.

The operating system 702 may manage hardware resources and provide common services. The operating system 702 may include, for example, a kernel 722, services 724, and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 720 provide a common infrastructure that is used by the applications 716 and/or other components and/or layers. The libraries 720 provide functionality that allows other software components to perform tasks in an easier fashion than to interface directly with the underlying operating system 702 functionality (e.g., kernel 722, services 724, and/or drivers 726). The libraries 720 may include system libraries 744 (e.g., C standard library) that may provide functions such as memory allocation functions, string manipulation functions, mathematical functions, and the like. In addition, the libraries 720 may include API libraries 746 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 720 may also include a wide variety of other libraries 748 to provide many other APIs to the applications 716 and other software components/modules.

The frameworks/middleware 718 (also sometimes referred to as middleware) provide a higher-level common infrastructure that may be used by the applications 716 and/or other software components/modules. For example, the frameworks/middleware 718 may provide various graphical user interface (GUI) functions, high-level resource management, high-level location services, and so forth. The frameworks/middleware 718 may provide a broad spectrum of other APIs that may be used by the applications 716 and/or other software components/modules, some of which may be specific to a particular operating system 702 or platform.

The applications 716 include built-in applications 738 and/or third-party applications 740. Examples of representative built-in applications 738 may include, but are not limited to, a contacts application, a browser application, a book reader application, a location application, a media application, a messaging application, and/or a game application. Third-party applications 740 may include an application developed using the ANDROID™ or IOS™ software development kit (SDK) by an entity other than the vendor of the particular platform, and may be mobile software running on a mobile operating system such as IOS™ ANDROID™, WINDOWS® Phone, or other mobile operating systems. The third-party applications 740 may invoke the API calls 708 provided by the mobile operating system (such as operating system 702) to facilitate functionality described herein.

The applications 716 may use built in operating system functions (e.g., kernel 722, services 724, and/or drivers 726), libraries 720, and frameworks/middleware 718 to create UIs to interact with users of the system. Alternatively, or additionally, in some systems, communication with a user may occur through a presentation layer, such as presentation layer 714. In these systems, the application/component "logic" can be separated from the aspects of the application/component that interact with a user.

Figure 8:
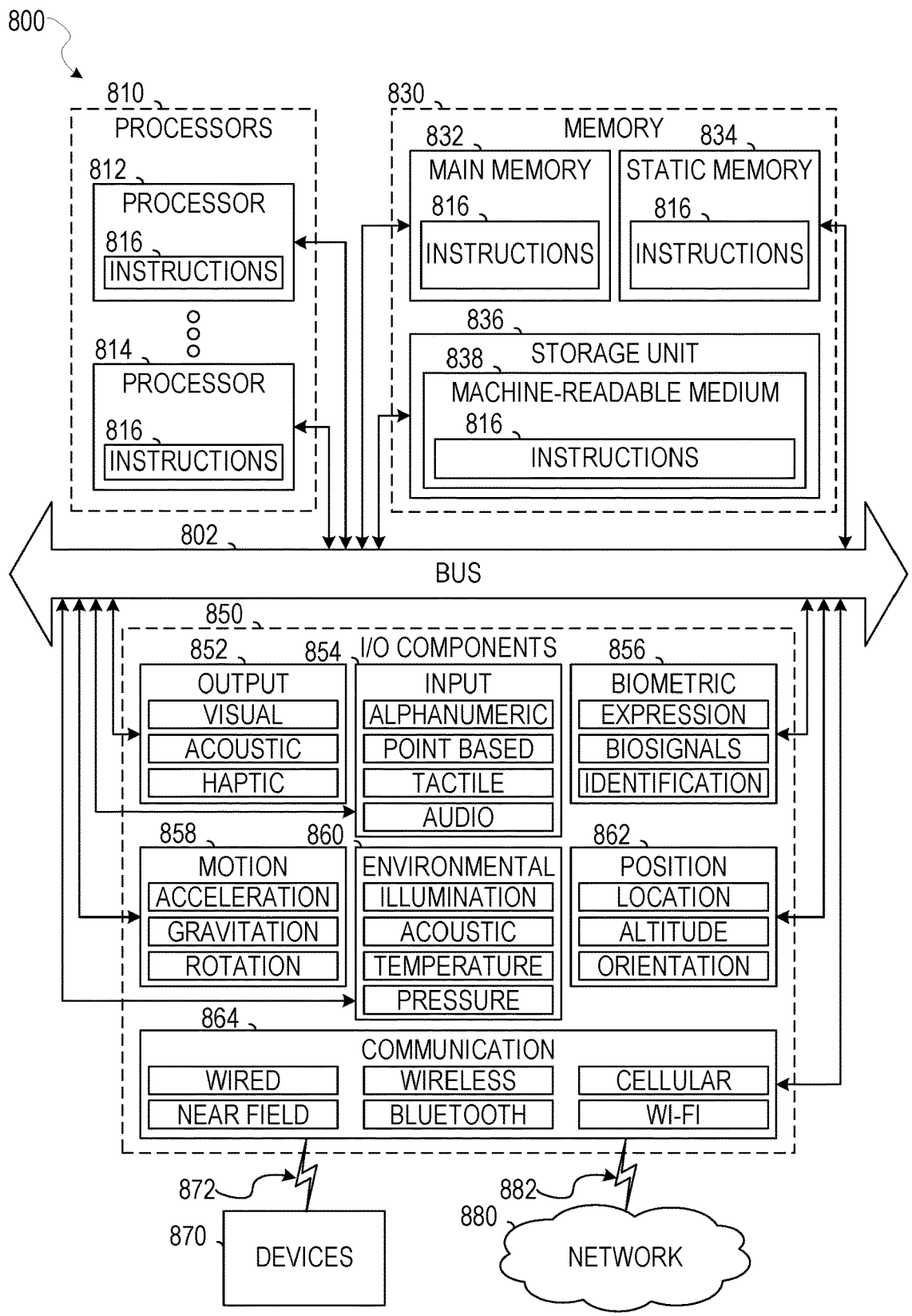
FIG. 8 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application-Specific Integrated Circuit (ASIC), a Radio-Frequency Integrated Circuit (RFIC), another processor, or any suitable combination thereof) may include, for example, a processor 812 and a processor 814 that may execute the instructions 816. The term "processor" is intended to include multi-core processors that may comprise two or more independent processors (also referred to as "cores") that may execute instructions contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836 accessible to the processors 810 via the bus 802. The storage unit 836 may include a machine-readable medium 838 on which are stored the instructions 816 embodying any one or more of the methodologies or functions described herein. The instructions 816 may also reside, completely or at least partially, within the main memory 832, within the static memory 834, within at least one of the processors 810 (e.g., within the processor's cache memory), or any suitable combination thereof, during execution thereof by the machine 800. Accordingly, in various implementations, the main memory 832, the static memory 834, and the processors 810 are considered machine-readable media 838.

As used herein, the term "memory" refers to a machine-readable medium 838 able to store data temporarily or permanently and may be taken to include, but not be limited to, random-access memory (RAM), read-only memory (ROM), buffer memory, flash memory, and cache memory. While the machine-readable medium 838 is shown in an example embodiment to be a single medium, the term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine (e.g., processors 810), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 850 include a wide variety of components to receive input, provide output, produce output, transmit information, exchange information, capture measurements, and so on. In general, it will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 include output components 852 and input components 854. The output components 852 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 854 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 850 include biometric components 856, motion components 858, environmental components 860, or position components 862, among a wide array of other components. For example, the biometric components 856 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 include acceleration sensor components (e.g., accelerometer), gravitation sensor components, rotation sensor components (e.g., gyroscope), and so forth. The environmental components 860 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 862 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 include a network interface component or another suitable device to interface with the network 880. In further examples, the communication components 864 include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a USB).

Moreover, in some implementations, the communication components 864 detect identifiers or include components operable to detect identifiers. For example, the communication components 864 include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, Uniform Commercial Code Reduced Space Symbology (UCC RSS)-2D bar code, and other optical codes), acoustic detection components (e.g., microphones to identify tagged audio signals), or any suitable combination thereof. In addition, a variety of information can be derived via the communication components 864, such as location via Internet Protocol (IP)

geolocation, location via Wi-Fi® signal triangulation, location via detecting an NFC beacon signal that may indicate a particular location, and so forth.

Transmission Medium

In various example embodiments, one or more portions of the network 880 may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WiFi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 816 are transmitted or received over the network 880 using a transmission medium via a network interface device (e.g., a network interface component included in the communication components 864) and utilizing any one of a number of well-known transfer protocols (e.g., Hypertext Transfer Protocol (HTTP)). Similarly, in other example embodiments, the instructions 816 are transmitted or received using a transmission medium via the coupling 872 (e.g., a peer-to-peer coupling) to the devices 870. The term "transmission medium" shall be taken to include any intangible medium that is capable of storing, encoding, or carrying the instructions 816 for execution by the machine 800, and includes digital or analog communications signals or other intangible media to facilitate communication of such software.

Furthermore, the machine-readable medium 838 is non-transitory (in other words, not having any transitory signals) in that it does not embody a propagating signal. However, labeling the machine-readable medium 838 as "non-transitory" should not be construed to mean that the medium is incapable of movement; the medium should be considered as being transportable from one physical location to another. Additionally, since the machine-readable medium 838 is tangible, the medium may be considered to be a machine-readable device.

Glossary

"CARRIER SIGNAL" in this context refers to any intangible medium that is capable of storing, encoding, or carrying instructions 816 for execution by the machine 800, and includes digital or analog communications signals or other intangible medium to facilitate communication of such instructions 816. Instructions 816 may be transmitted or received over the network 880 using a transmission medium via a network interface device and using any one of a number of well-known transfer protocols.

"CLIENT DEVICE" in this context refers to any machine 800 that interfaces to a communications network 880 to obtain resources from one or more server systems or other client devices 110, 120. A client device 110, 120 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 880.

"COMMUNICATIONS NETWORK" in this context refers to one or more portions of a network 880 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 880 or a portion of a network 880 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device, or other tangible media able to store instructions 816 and data temporarily or permanently and may include, but is not to be limited to: random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 816. The term "machine-readable medium" shall also be taken to include any medium, or combination of multiple media, that is capable of storing instructions 816 (e.g., code) for execution by a machine 800, such that the instructions 816, when executed by one or more processors 810 of the machine 800, cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors 804) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 810 or other programmable processors 810. Once configured by such software, hardware components become specific machines 800 (or specific components of a machine 800) uniquely tailored to perform the configured functions and are no longer general-purpose processors 810. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 810 configured by software to become a special-purpose processor, the general-purpose processor 810 may be configured as respectively different special-purpose processors (e.g., comprising different hardware components) at different times. Software accordingly configures a particular processor or processors 810, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 802) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices and can operate on a resource (e.g., a collection of information). The various operations of example methods described herein may be performed, at least partially, by one or more processors 810 that are temporarily configured (e.g., by software) or permanently configured to perform the relevant operations. Whether temporarily or permanently configured, such processors 810 may constitute processor-implemented components that operate to perform one or more operations or functions described herein. As used herein, "processor-implemented component" refers to a hardware component implemented using one or more processors 810. Similarly, the methods described herein may be at least partially processor-implemented, with a particular processor or processors 804 being an example of hardware. For example, at least some of the operations of a method may be performed by one or more processors 810 or processor-implemented components. Moreover, the one or more processors 810 may also operate to support performance of the relevant operations in a "cloud computing" environment or as a "software as a service" (SaaS). For example, at least some of the operations may be performed by a group of computers (as examples of machines 800 including processors 810), with these operations being accessible via a network 880 (e.g., the Internet) and via one or more appropriate interfaces (e.g., an API). The performance of certain of the operations may be distributed among the processors 810, not only residing within a single machine 800, but deployed across a number of machines 800. In some example embodiments, the processors 810 or processor-implemented components may be located in a single geographic location (e.g., within a home environment, an office environment, or a server farm). In other example embodiments, the processors 810 or processor-implemented components may be distributed across a number of geographic locations.

"PROCESSOR" in this context refers to any circuit or virtual circuit (a physical circuit emulated by logic executing on an actual processor 810) that manipulates data values according to control signals (e.g., "commands," "op codes," "machine code," etc.) and which produces corresponding output signals that are applied to operate a machine 800. A processor 810 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 810 may further be a multi-core processor having two or more independent processors 810 (sometimes referred to as "cores") that may execute instructions 816 contemporaneously.

What is claimed is:

1. A system comprising:
one or more processors; and
a memory that stores instructions that, when executed by the one or more processors, cause the one or more processors to perform operations comprising:
storing configuration data associated with a customer identifier;
receiving, via a first application programming interface (API), a first request to create a communication session, the first request comprising an identifier of a channel for the communication session, the customer identifier, and an identifier of an intended recipient of the communication session;
selecting a communication orchestrator based on the identifier of the channel;
sending, to the communication orchestrator and via a second API, a second request to create the communication session, the second request including the customer identifier;
receiving a third request from the communication orchestrator, the third request including the customer identifier;
responding to the third request with the configuration data; and
creating, by the communication orchestrator, the communication session.

2. The system of claim 1, wherein:
the channel comprises one of a voice channel, a video channel, and a text channel; and
the selecting of the communication orchestrator comprises selecting among a voice orchestrator, a video orchestrator, and a text orchestrator.

3. The system of claim 1, wherein the operations further comprise:
receiving, via the first API, a fourth request to create a second communication session,
the fourth request comprising an identifier of a second channel for the second communication session;
selecting a second communication orchestrator based on the identifier of the second channel, the second communication orchestrator being different than the communication orchestrator; and
sending, to the second communication orchestrator and via a third API, a fifth request to create the second communication session.

4. The system of claim 1, wherein the operations further comprise:
receiving, via the first API, a fourth request to end the communication session, the
fourth request comprising an identifier of the communication session;
identifying the communication orchestrator based on the identifier of the communication session; and
sending, to the communication orchestrator and via the second API, a fifth request to end the communication session.

5. The system of claim 1, wherein the operations further comprise:
receiving, via the first API, a fourth request to add a participant to the communication session, the fourth request comprising an identifier of the communication session;
identifying the communication orchestrator based on the identifier of the communication session; and
sending, to the communication orchestrator and via the second API, a fifth request to add the participant to the communication session.

6. The system of claim 5, wherein the operations further comprise:
receiving, via the first API, a sixth request to mute the participant; and
sending, to the communication orchestrator and via the second API, a seventh request to mute the participant.

7. A non-transitory machine-readable medium that stores instruction that, when executed by one or more processors, cause the one or more processors to perform operations comprising:
storing configuration data associated with a customer identifier;
receiving, via a first application programming interface (API), a first request to create a communication session, the first request comprising an identifier of a channel for the communication session, the customer identifier, and an identifier of an intended recipient of the communication session;
selecting a communication orchestrator based on the identifier of the channel;
sending, to the communication orchestrator and via a second API, a second request to create the communication session, the second request including the customer identifier;
receiving a third request from the communication orchestrator, the third request including the customer identifier;
responding to the third request with the configuration data; and
creating, by the communication orchestrator, the communication session.

8. The non-transitory machine-readable medium of claim 7, wherein:
the channel is a voice channel or a text channel; and
the selecting of the communication orchestrator selects between a voice orchestrator and a text orchestrator.

9. The non-transitory machine-readable medium of claim 7, wherein the operations further comprise:
receiving, via the first API, a fourth request to create a second communication session, the fourth request comprising an identifier of a second channel for the second communication session;
selecting a second communication orchestrator based on the identifier of the second channel, the second communication orchestrator being different than the communication orchestrator; and
sending, to the second communication orchestrator and via a third API, a fifth request to create the second communication session.

10. The non-transitory machine-readable medium of claim 7, wherein the operations further comprise:
receiving, via the first API, a fourth request to end the communication session, the fourth request comprising an identifier of the communication session;
identifying the communication orchestrator based on the identifier of the communication session; and
sending, to the communication orchestrator and via the second API, a fifth request to end the communication session.

11. The non-transitory machine-readable medium of claim 7, wherein the operations further comprise:

receiving, via the first API, a fourth request to add a participant to the communication session, the fourth request comprising an identifier of the communication session;
identifying the communication orchestrator based on the identifier of the communication session; and
sending, to the communication orchestrator and via the second API, a fifth request to add the participant to the communication session.

12. The non-transitory machine-readable medium of claim 11, wherein the operations further comprise:
receiving, via the first API, a sixth request to mute the participant; and
sending, to the communication orchestrator and via the second API, a seventh request to mute the participant.

13. A method comprising:
storing configuration data associated with a customer identifier;
receiving, by one or more processors and via a first application programming interface (API), a first request to create a communication session, the first request comprising an identifier of a channel for the communication session, the customer identifier, and an identifier of an intended recipient of the communication session;
selecting a communication orchestrator based on the identifier of the channel;
sending, to the communication orchestrator and via a second API, a second request to create the communication session, the second request including the customer identifier;
receiving a third request from the communication orchestrator, the third request including the customer identifier;
responding to the third request with the configuration data; and
creating, by the communication orchestrator, the communication session.

14. The method of claim 13, wherein:
the channel comprises one of a voice channel, a video channel, and a text channel; and
the selecting of the communication orchestrator comprises selecting among a voice orchestrator, a video orchestrator, and a text orchestrator.

15. The method of claim 13, further comprising:
receiving, via the first API, a fourth request to create a second communication session, the fourth request comprising an identifier of a second channel for the second communication session;
selecting a second communication orchestrator based on the identifier of the second channel, the second communication orchestrator being different than the communication orchestrator; and
sending, to the second communication orchestrator and via a third API, a fifth request to create the second communication session.

16. The method of claim 13, further comprising:
receiving, via the first API, a fourth request to end the communication session, the fourth request comprising an identifier of the communication session;
identifying the communication orchestrator based on the identifier of the communication session; and
sending, to the communication orchestrator and via the second API, a fifth request to end the communication session.

17. The method of claim 13, further comprising:
receiving, via the first API, a fourth request to add a participant to the communication session, the fourth request comprising an identifier of the communication session;
identifying the communication orchestrator based on the identifier of the communication session; and
sending, to the communication orchestrator and via the second API, a fifth request to add the participant to the communication session.

18. The system of claim 1, wherein the operations further comprise:
publishing, by the communication orchestrator, an event of the communication session to an event service; and
receiving, from the event service, a notification of the published event.

19. The system of claim 18, wherein the operation further comprise:
based on the notification, sending an additional request to the communication orchestrator.

20. The system of claim 18, wherein the operations further comprise:
based on the notification, sending status information to a sender of the first request.

* * * * *

UNITED STATES PATENT AND TRADEMARK OFFICE
CERTIFICATE OF CORRECTION

PATENT NO. : 11,973,809 B2
APPLICATION NO. : 17/660998
DATED : April 30, 2024
INVENTOR(S) : Govil et al.

Page 1 of 1

It is certified that error appears in the above-identified patent and that said Letters Patent is hereby corrected as shown below:

On the Title Page

In item (71), in "Applicant", in Column 1, Line 1, delete "Twillio" and insert --Twilio-- therefor In the Claims In Column 31, Line 39, in Claim 3, after "session,", delete a linebreak In Column 31, Line 52, in Claim 4, after "the", delete a linebreak Signed and Sealed this
Eighth Day of July, 2025

Coke Morgan Stewart
*Acting Director of the United States Patent and Trademark Office*